US011917024B2

(12) United States Patent
Maekawa et al.

(10) Patent No.: US 11,917,024 B2
(45) Date of Patent: Feb. 27, 2024

(54) CONTROL SYSTEM, SUPPORT APPARATUS, AND PROGRAM FOR SUPPORT APPARATUS

(71) Applicant: OMRON Corporation, Kyoto (JP)

(72) Inventors: Norihiro Maekawa, Takatsuki (JP); Hiroko Kubo, Kusatsu (JP)

(73) Assignee: OMRON CORPORATION, Kyoto (JP)

(*) Notice: Subject to any disclaimer, the term of this patent is extended or adjusted under 35 U.S.C. 154(b) by 0 days.

(21) Appl. No.: 17/435,246

(22) PCT Filed: Feb. 12, 2020

(86) PCT No.: PCT/JP2020/005273
§ 371 (c)(1),
(2) Date: Aug. 31, 2021

(87) PCT Pub. No.: WO2020/184035
PCT Pub. Date: Sep. 17, 2020

(65) Prior Publication Data
US 2022/0210247 A1 Jun. 30, 2022

(30) Foreign Application Priority Data
Mar. 14, 2019 (JP) .................................. 2019-047166

(51) Int. Cl.
*G06F 15/173* (2006.01)
*H04L 67/00* (2022.01)
*G05B 19/05* (2006.01)

(52) U.S. Cl.
CPC ............ *H04L 67/34* (2013.01); *G05B 19/054* (2013.01); *G05B 2219/1147* (2013.01)

(58) Field of Classification Search
CPC ....................................................... H04L 67/34
See application file for complete search history.

(56) References Cited

U.S. PATENT DOCUMENTS 10,977,318 B2 * 4/2021 Yoshioka .............. G06F 16/951
2006/0053211 A1 * 3/2006 Kornerup .............. G06F 11/323
709/217

(Continued)

FOREIGN PATENT DOCUMENTS

CN 101794131 A 8/2010
CN 103929371 A 7/2014
(Continued)

OTHER PUBLICATIONS

Translation of KR-20190050998-A (Year: 2019).*
(Continued)

*Primary Examiner* — Yves Dalencourt
(74) *Attorney, Agent, or Firm* — Sughrue Mion, PLLC

(57) ABSTRACT

A control system includes a control device and a device that communicates with the control device. The control system includes a controller that periodically performs a control operation for controlling an object to be controlled, a communication processor that performs communication processing for periodically exchanging data with the device, a providing component that provides a development environment for performing a part of creation of contents of processing performed by the controller and for making of settings involved with communication processing by the communication processor, and a determination module that determines a settable range of a cycle time of exchange of data with the device based on contents set in the development environment.

17 Claims, 18 Drawing Sheets

(56) References Cited

U.S. PATENT DOCUMENTS

| | | | | |
|---|---|---|---|---|
| 2006/0212846 | A1* | 9/2006 | O'Farrell | H04L 67/01 717/116 |
| 2009/0286603 | A1* | 11/2009 | Mori | A63F 13/335 463/42 |
| 2010/0199002 | A1 | 8/2010 | Izumi | |
| 2012/0029659 | A1* | 2/2012 | Taira | G06F 9/4887 700/14 |
| 2014/0200684 | A1 | 7/2014 | Mizutani | |
| 2016/0344653 | A1 | 11/2016 | Kiribuchi | |
| 2018/0101393 | A1 | 4/2018 | Fukuda et al. | |
| 2019/0149623 | A1* | 5/2019 | McPhee | H04L 67/52 709/223 |
| 2019/0372746 | A1 | 12/2019 | Tamura et al. | |
| 2020/0293302 | A1* | 9/2020 | Sato | G06F 9/4881 |
| 2021/0049048 | A1* | 2/2021 | Quintana | G06F 9/5027 |

FOREIGN PATENT DOCUMENTS

| | | |
|---|---|---|
| CN | 106227140 A | 12/2016 |
| CN | 106416140 A | 2/2017 |
| CN | 107918299 A | 4/2018 |
| JP | 10-307613 A | 11/1998 |
| JP | 2002-353984 A | 12/2002 |
| JP | 2004-318508 A | 11/2004 |
| JP | 2009-223398 A | 10/2009 |
| JP | 2017-027539 A | 2/2017 |
| JP | 2018-128780 A | 8/2018 |
| KR | 20190050998 A * | 5/2019 |

OTHER PUBLICATIONS

International Search Report for PCT/JP2020/005273 dated Mar. 24, 2020 (PCT/ISA/210).
Written Opinion for PCT/JP2020/005273 dated Mar. 24, 2020 (PCT/ISA/237).
Omron, "Machine Automation Controller NX-series Safety Control Unit User's Manual", Feb. 20, 2017, <https://www.supportomron.fr/telechargements/documentations/2017-02-20%20-%2009-28-36%20-%20554310647/Z930-E1-17+NX%20Safety+User%20Manual.pdf>, [retrieved on Oct. 25, 2022] (652 pages total).
Extended European Search Report dated Nov. 8, 2022 from the European Patent Office in EP Application No. 20769324.3.
Communication dated Dec. 6, 2023 issued by the State Intellectual Property Office of the P.R.China in application No. 202080017558.4.

* cited by examiner

FIG.6
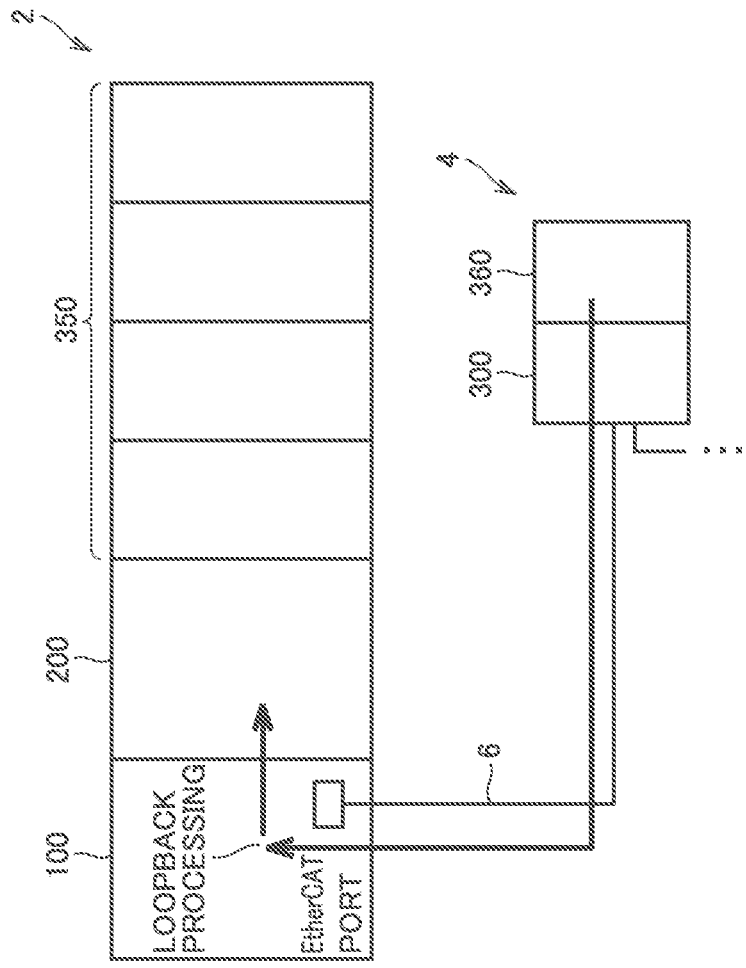
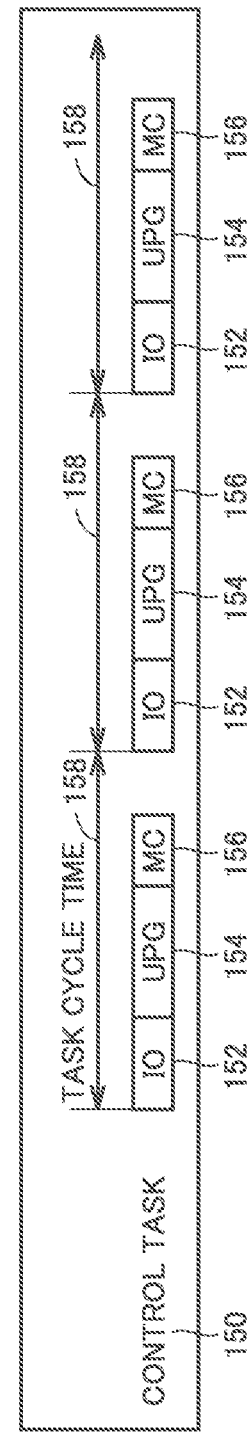

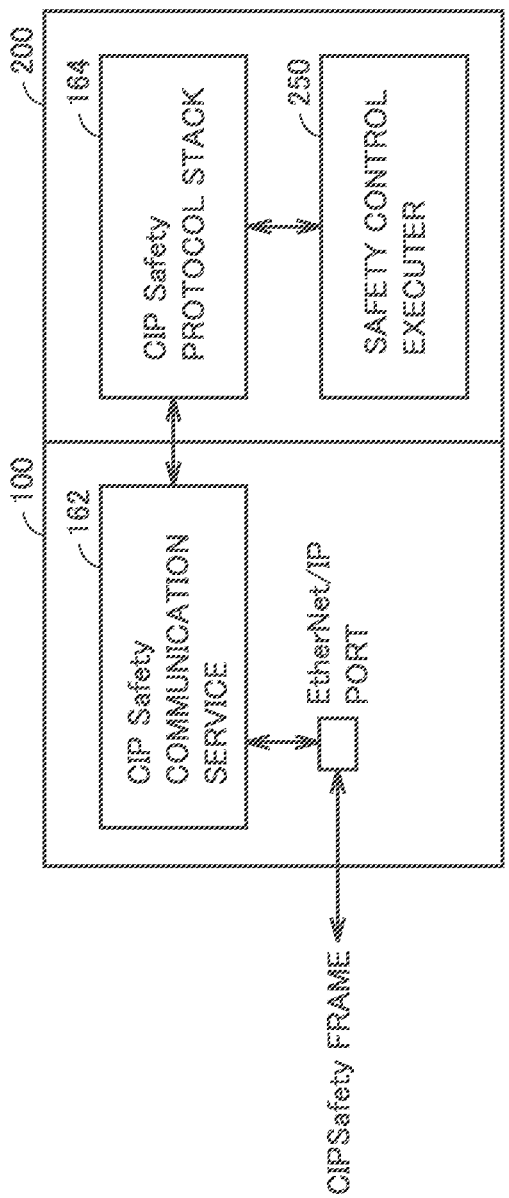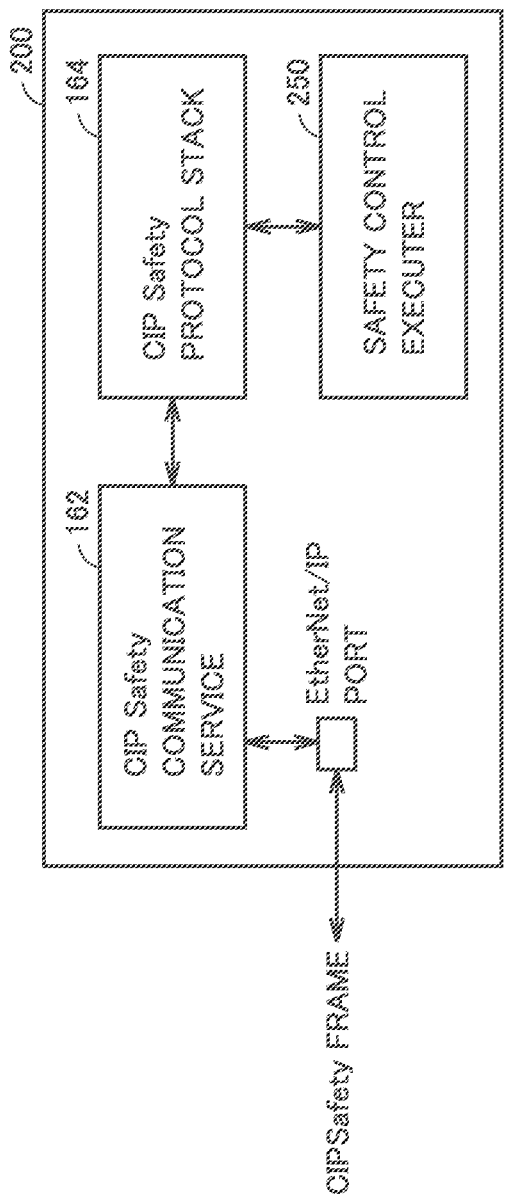
FIG. 9 (a)  FIG. 9 (b)

FIG.15

| SETTABLE EPI (ms) | TASK CYCLE TIME Ts | THE NUMBER OF CONNECTIONS Sc | TYPE |
|---|---|---|---|
| 30~500 | 10 | 40 | CONTROLLER α |

FIG. 16 (a)

| TARGET DEVICE | EPI SET VALUE | TASK CYCLE TIME Ts | THE NUMBER OF CONNECTIONS Sc | TYPE |
|---|---|---|---|---|
| XXX | 20ms | 10 | 40 | CONTROLLER α |
| YYY | 40ms | – | – | – |
| ZZZ | 40ms | – | – | – |
| ... | | | | |

FIG. 16 (b)

| TARGET DEVICE | EPI SET VALUE | TASK CYCLE TIME Ts | THE NUMBER OF CONNECTIONS Sc | TYPE |
|---|---|---|---|---|
| XXX | 20ms | 10 | 40 | CONTROLLER α |
| YYY | 40ms | – | – | – |
| ZZZ | 40ms | – | – | – |
| ... | | | | |

CAN BE SET BY SETTING THE NUMBER OF CONNECTIONS TO 30 OR SMALLER

FIG.17

| ▼ EtherNet/IP PORT 1 (192.168.250.1) | | | | | |
|---|---|---|---|---|---|
| | ACTIVE | In/Out | TARGET DEVICE/ TARGET I/O ASSEMBLY | COMMENT | EPI [ms] | NETWORK RESPONSE TIME PERIOD [ms] |
| ⓪ ▼ | ☑ | | 192.168.250.2 GI-SID1224 | | | |
| ① | ☑ | ⇕ | Safety Input~[2Bytes] | | 10 ▼ | 162.048 |
| | | | | | | VALUE BEING OUT OF RANGE OF 28-500 |

590, 596, 595, 594, 593, 592

CONTROL SYSTEM, SUPPORT APPARATUS, AND PROGRAM FOR SUPPORT APPARATUS

CROSS REFERENCE TO RELATED APPLICATIONS

This application is a National Stage of International Application No. PCT/JP2020/005273 filed Feb. 12, 2020, claiming priority based on Japanese Patent Application No. 2019-047166 filed Mar. 14, 2019, the entire content of each of which being herein incorporated by reference in their entireties.

TECHNICAL FIELD

The present invention relates to a control system configured to periodically exchange data, a support apparatus, and a program for a support apparatus.

BACKGROUND ART

A programmable logic controller (PLC) is employed as a control device configured to control a facility or a machine. In addition to the PLC, a safety system including a safety controller and various safety components may also be arranged.

With advance of information and communication technology (ICT), such an industrial controller has also increasingly been networked. In a known configuration, as disclosed, for example, in PTL 1 (Japanese Patent Laying-Open No. 2009-223398), in addition to a CPU unit configured to perform computing processing, a communication unit responsible for communication processing is attached. As disclosed in PTL 2 (Japanese Patent Laying-Open No. 2017-027539), a configuration in which a communication module representing one exemplary IO module is attached separately from a CPU module to perform communication processing is general.

CITATION LIST

Patent Literature

PTL 1: Japanese Patent Laying-Open No. 2009-223398
PTL 2: Japanese Patent Laying-Open No. 2017-027539

SUMMARY OF INVENTION

Technical Problem

Normally, in a control operation for controlling an object to be controlled such as a facility or a machine, input and output data (IO data) should periodically be updated. In order to periodically update such IO data, data should periodically be exchanged with a device from which IO data is collected.

In periodically exchanging data over a network, however, there are various restriction factors, and it is not easy to determine to which value a communication cycle time should be set.

An object of the present invention is to provide a configuration in which a settable range of a cycle time of exchange of data with a device can readily be determined.

Solution to Problem

According to one embodiment of the present invention, a control system including a control device and a device configured to communicate with the control device is provided. The control system includes control means configured to periodically perform a control operation for controlling an object to be controlled, communication processing means configured to perform communication processing for periodically exchanging data with the device, providing means configured to provide a development environment for performing at least a part of creation of contents of processing performed by the control means and making of settings involved with communication processing by the communication processing means, and determination means configured to determine a settable range of a cycle time of exchange of data with the device based on contents set in the development environment provided by the providing means.

According to this embodiment, since the settable range of the cycle time of exchange of data with the device is determined based on contents of processing performed by the control means and settings involved with communication processing, even a user with less knowledge can set an appropriate cycle time.

The determination means may determine the settable range with both of a restriction factor determined in accordance with the contents of processing performed by the control means and a restriction factor determined in accordance with settings involved with communication processing by the communication processing means being reflected. According to this configuration, an appropriate range on which both of the restriction factor determined in accordance with contents of processing performed by the control means and the restriction factor determined in accordance with settings involved with communication processing by the communication processing means are reflected can be determined.

The determination means may determine the settable range based on at least one of the number of connections and a data size of data exchanged with the device. According to this configuration, an appropriate range can be determined in accordance with data exchanged with the device.

The determination means may determine the settable range based on a cycle time of the control operation performed by the control means. According to this configuration, an appropriate range can be determined in accordance with the cycle time of the control operation.

The determination means may determine the settable range based on priority defined for the control operation performed by the control means. According to this configuration, an appropriate range can be determined in accordance with priority defined for the control operation.

The determination means may determine the settable range based on processing capability of the control device. According to this configuration, an appropriate range can be determined in accordance with processing capability of the control device.

The determination means may determine the settable range for each device with which the control device exchanges data. According to this configuration, when data is exchanged with a plurality of devices, a range appropriate for each device can be determined.

Notification means configured to give a notification when a set value of the cycle time of exchange of data with the device is out of the settable range determined by the determination means may further be included. According to this configuration, when a currently set value is out of the settable range of the cycle time, a user can be prompted to make appropriate change.

According to another embodiment of the present invention, a support apparatus directed to a control system including a control device and a device configured to communicate with the control device is provided. The control device includes control means configured to periodically perform a control operation for controlling an object to be controlled and communication processing means configured to perform communication processing for periodically exchanging data with the device. The support apparatus includes providing means configured to provide a development environment for performing at least a part of creation of contents of processing performed by the control means and making of settings involved with communication processing by the communication processing means and determination means configured to determine a settable range of a cycle time of exchange of data with the device based on contents set in the development environment provided by the providing means.

According to yet another embodiment of the present invention, a program for a support apparatus directed to a control system including a control device and a device configured to communicate with the control device is provided. The control device includes control means configured to periodically perform a control operation for controlling an object to be controlled and communication processing means configured to perform communication processing for periodically exchanging data with the device. The program, when executed by a computer, causes the computer to perform providing a development environment for performing at least a part of creation of contents of processing performed by the control means and making of settings involved with communication processing by the communication processing means and determining a settable range of a cycle time of exchange of data with the device based on contents set in the development environment.

Advantageous Effects of Invention

According to the present invention, a settable range of a cycle time of exchange of data with a device can readily be determined.

BRIEF DESCRIPTION OF DRAWINGS

FIG. 6 is a schematic diagram for illustrating FSoE in the control system according to the present embodiment.

FIGS. 9(a) and 9(b) are schematic diagrams showing an exemplary implementation of the functional configuration shown in FIG. 8.

FIG. 15 is a diagram showing an exemplary user interface screen provided by the control system according to the present embodiment.

FIGS. 16(a) and 16(b) are diagrams showing another exemplary user interface screen provided by the control system according to the present embodiment.

FIG. 17 is a diagram showing yet another exemplary user interface screen provided by the control system according to the present embodiment.

DESCRIPTION OF EMBODIMENTS

Figure 1:
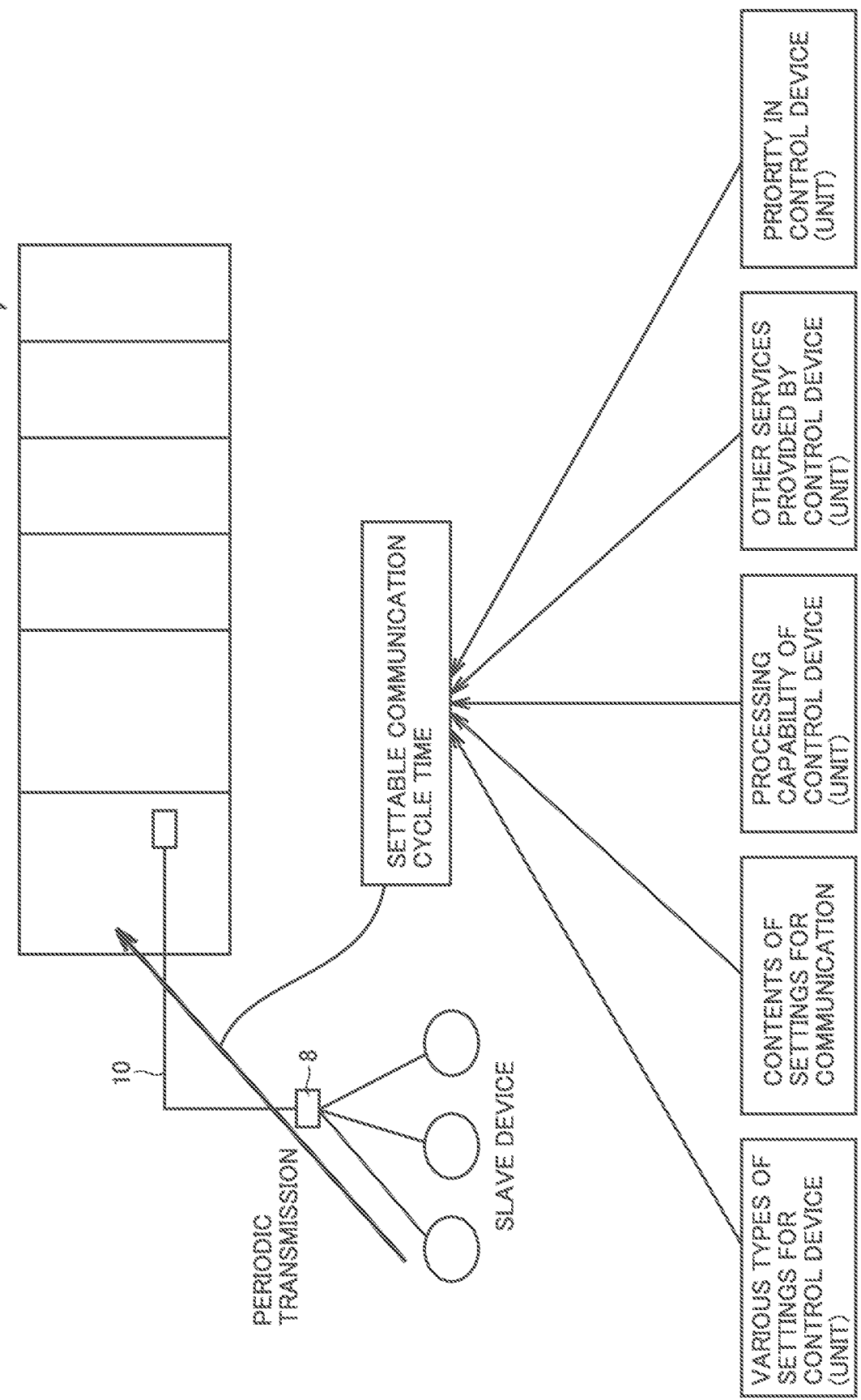
FIG. 1 is a diagram for illustrating overview of processing in a control system according to the present embodiment.

An embodiment of the present invention will be described in detail with reference to the drawings. The same or corresponding elements in the drawings have the same reference characters allotted and description thereof will not be repeated.

A. Application

An exemplary scene to which the present invention is applied will initially be described with reference to FIG. 1.

FIG. 1 is a diagram for illustrating overview of processing in a control system 1 according to the present embodiment. Referring to FIG. 1, a control device 2 is connected to one or more devices over a process network 10. A hub 8 may be arranged in process network 10.

Control device 2 periodically performs a control operation for controlling an object to be controlled. Control device 2 performs communication processing for periodically exchanging data with the device. In other words, data is periodically exchanged between control device 2 and the device.

In consideration of such communication processing, control device 2 can determine a settable range of a cycle time (communication cycle time) of exchange of data with the device. Specifically, control device 2 calculates a settable communication cycle time in accordance with processing performed in control device 2 and settings involved with communication processing.

Calculation of such a settable communication cycle time may be based on restriction factors as below.

Various types of settings for control device (unit)
Contents of settings for communication
Processing capability (spec) of control device (unit)
Other services provided by control device (unit)
Priority in control device (unit)

Such restriction factors may be determined based on contents set in a development environment provided by a support apparatus as will be described later and a settable communication cycle time may be calculated based on the determined restriction factors.

The "settable range" is a term encompassing a range within which a value of interest can effectively be set, and may encompass not only a case in which both of an upper limit and a lower limit are defined but also a case in which only the lower limit or only the upper limit is defined. In particular in the present embodiment, attention is paid to determination of the lower limit (minimum value).

Principal data transmitted and received between the control device and each device is herein described as a "frame". Transmitted and received data, however, should not be interpreted as being limited by the term "frame", but for example, a case in which data is transmitted and received in a unit of a "packet" or a case in which data is transmitted and received in a unit of a data string that is longer may also be encompassed.

The terms "standard control" and "safety control" are herein used in comparison to each other. "Standard control" is collective denotation of processing for controlling an object to be controlled in accordance with required specifications determined in advance. "Safety control" is collective denotation of processing for preventing human safety from being threatened by a facility or a machine. "Safety control" is designed to meet requirements for performing the safety function defined under IEC 61508.

B. Exemplary System Configuration

Figure 2:
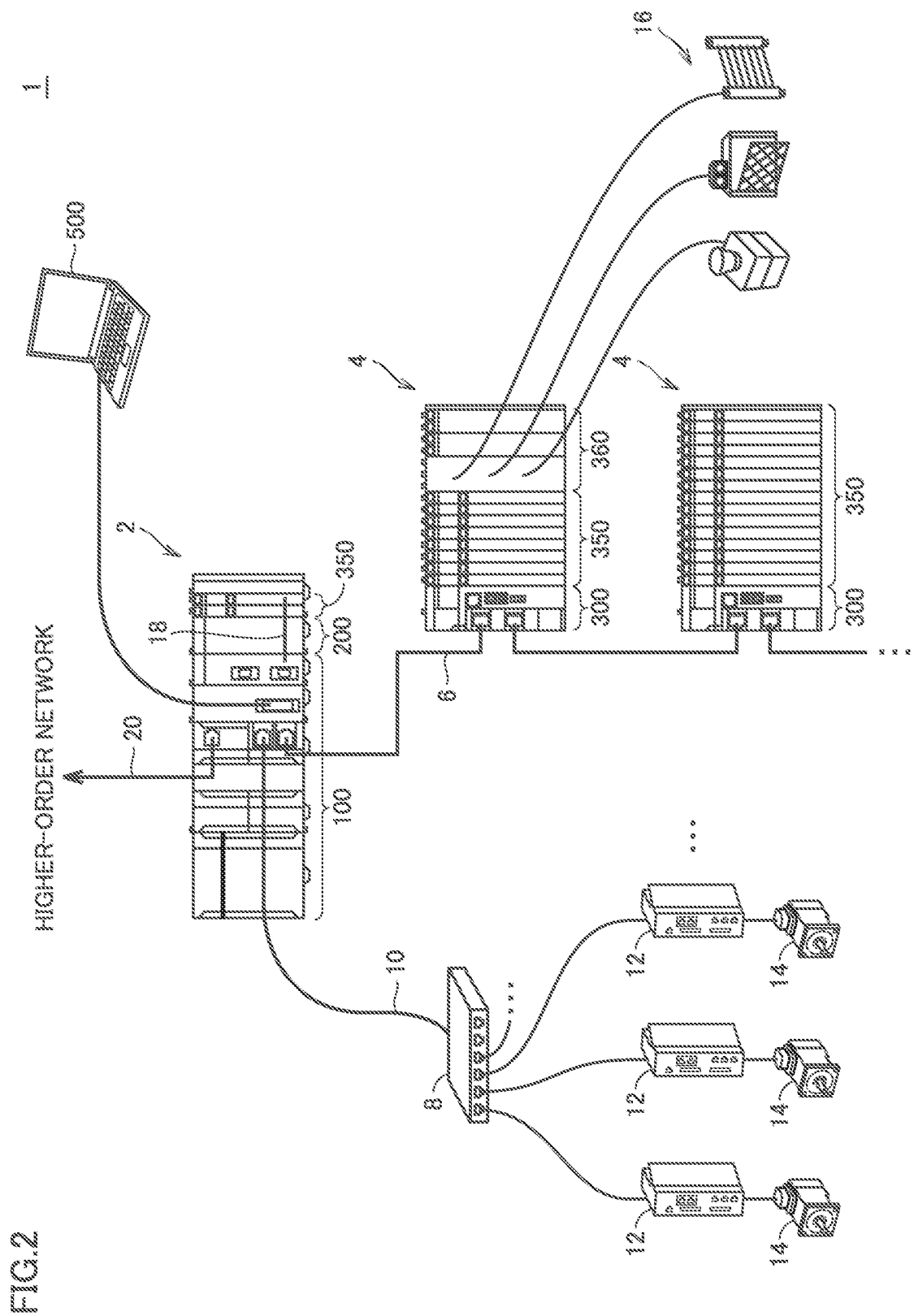
FIG. 2 is a schematic diagram showing an exemplary configuration of the control system according to the present embodiment.

An exemplary configuration of control system 1 according to the present embodiment will initially be described. FIG. 2 is a schematic diagram showing an exemplary configuration of control system 1 according to the present embodiment.

Referring to FIG. 2, control system 1 includes control device 2, one or more remote IO apparatuses 4, and one or more slave devices, by way of example.

Control device 2 is a processing entity that performs a control operation, and includes a standard control unit 100, a safety control unit 200, and one or more functional units 350. Standard control unit 100 performs a control operation involved with standard control and communication processing as will be described later. Safety control unit 200 performs a control operation involved with safety control. Each functional unit 350 performs processing in accordance with a function (for example, an input and output function, a position control function, a PID control function, etc.) implemented in each unit. Safety control unit 200 can also be regarded as a kind of functional unit 350.

Standard control unit 100 is electrically connected to safety control unit 200 and functional unit 350 through an internal bus 18.

Control device 2 (standard control unit 100) is electrically connected to remote IO apparatus 4 over a field network 6. Control device 2 is communicatively connected further to a safety driver 12 which is an exemplary slave device with process network 10 and hub 8 being interposed.

Field network 6 is a communication medium for data transmission for factory automation (FA). A frame can be transmitted over field network 6 in each predetermined cycle time, and time of arrival of data at each node within the network is guaranteed. In control system 1 according to the present embodiment, EtherCAT® is adopted for field network 6 as an exemplary protocol under which such time of arrival of data is guaranteed. Data used for safety control as will be described later may be transmitted in conformity with functional safety over EtherCAT® (FSoE) using EtherCAT®.

Process network 10 is a communication medium for data transmission for FA, similarly to field network 6. In control system 1 according to the present embodiment, EtherNet/IP™ is adopted for process network 10. Data used for safety control as will be described later may be transmitted in conformity with CIP Safety using EtherNet/IP™. Here, CIP refers to Common Industrial Protocol.

Control device 2 (standard control unit 100) may further be connected to higher-order network 20. Any information processing apparatus such as a gateway or a database server may be connected to higher-order network 20.

Remote IO apparatus 4 includes a coupler unit 300 and one or more functional units 350. Remote IO apparatus 4 collects various types of information from an object to be controlled and transmits them to control device 2, and provides a signal to the control device or performs processing in accordance with an instruction included in data from control device 2.

Coupler unit 300 mediates data exchange between control device 2 (standard control unit 100) and functional unit 350. In addition, coupler unit 300 transmits data received in a frame to functional unit 350, and when coupler unit 300 receives data from functional unit 350, it prepares for storage of the received data in a frame that will arrive next.

Functional unit 350 is substantially identical to functional unit 350 included in control device 2, and performs processing in accordance with a function (for example, an input and output function, a position control function, a PID control function, etc.) implemented in each unit.

Coupler unit 300 may also include a safety functional unit 360 by way of example of functional unit 350. FIG. 2 shows an example in which a single remote IO apparatus 4 includes safety functional unit 360. Safety functional unit 360 performs a function involved with safety control. By way of example, safety functional unit 360 is a safety IO unit. The safety IO unit performs an input function to accept a signal from a safety component 16 such as an emergency stop button, a safety door switch, or a safety light curtain and/or an output function to provide a signal to safety component 16.

Data may be exchanged between safety control unit 200 and safety functional unit 360 in conformity with FSoE which represents a kind of peer-to-peer communication using a frame periodically transmitted over field network 6.

FIG. 2 shows safety driver 12 that drives a motor 14 as a slave device. Safety driver 12 drives connected motor 14 in response to an instruction from control device 2 (standard control unit 100) and includes also a function as a safety component involved with drive of motor 14. Motor 14 is an arbitrary mobile body such as a servo motor, an induction motor, a synchronous motor, or a linear motor.

Safety driver 12 exchanges data with control device 2 (standard control unit 100) by using connection established therebetween. An example in which OP Safety is adopted as a protocol for exchange of data will be described below.

A support apparatus 500 is directed to control system 1, and provides a user with an environment for creation and debugging of a program to be executed in control device 2 (standard control unit 100 and safety control unit 200) and for support of various types of settings.

C. Exemplary Hardware Configuration

An exemplary hardware configuration of main apparatuses included in control system 1 will now be described.

(c1: Standard Control Unit)

Figure 3:
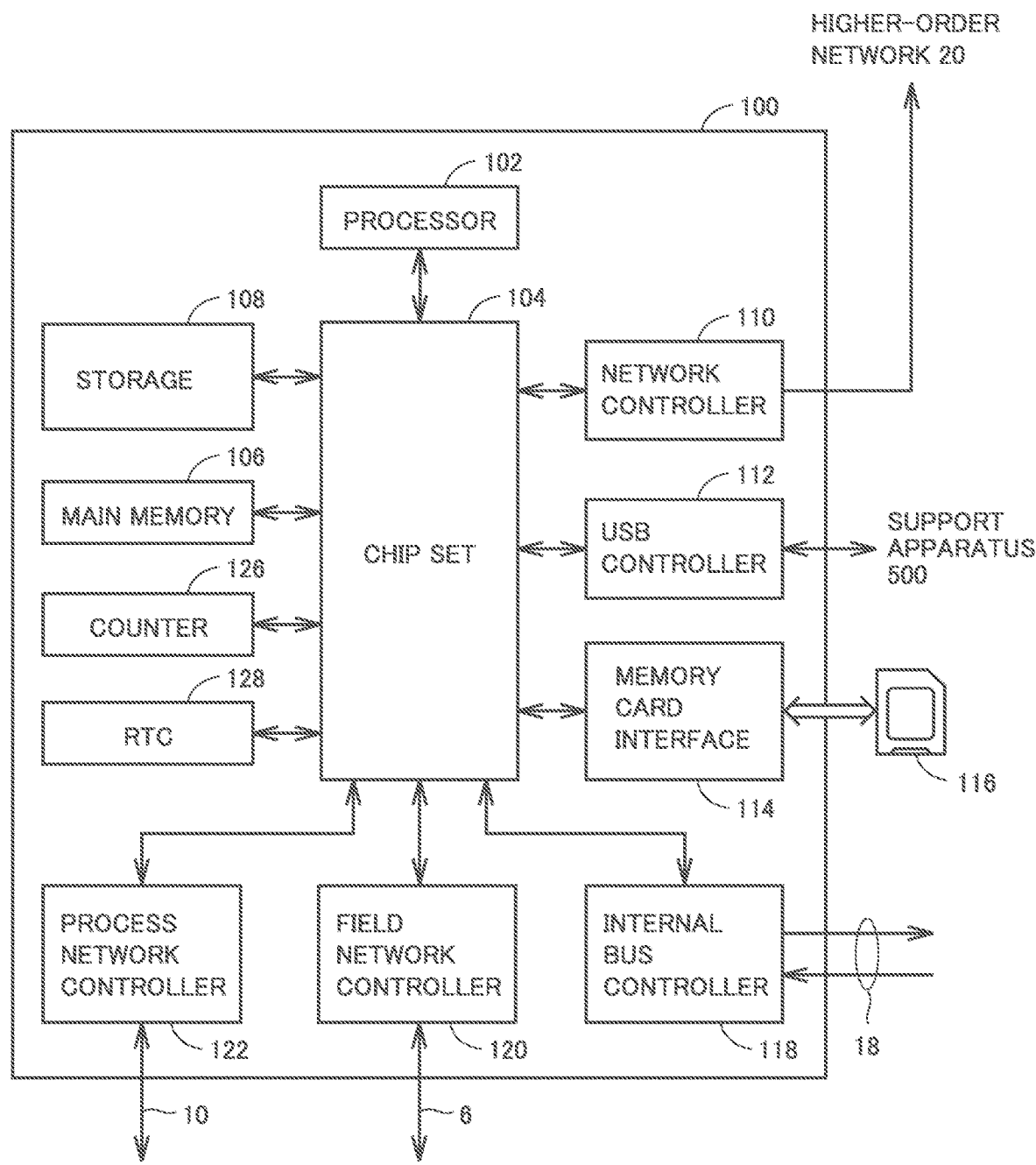
FIG. 3 is a schematic diagram showing an exemplary hardware configuration of a standard control unit included in the control system according to the present embodiment.

FIG. 3 is a schematic diagram showing an exemplary hardware configuration of standard control unit 100 included in control system 1 according to the present embodiment. Referring to FIG. 3, standard control unit 100 includes a processor 102, a chip set 104, a main memory 106, a storage 108, a network controller 110, a universal serial bus (USB) controller 112, a memory card interface 114, an internal bus controller 118, a field network controller 120, a process network controller 122, a counter 126, and a real time clock (RTC) 128.

Processor 102 corresponds to a computing processing unit that performs a control operation or the like, and is configured with a central processing unit (CPU), a micro processing unit (MPU), or a graphics processing unit (GPU). Specifically, processor 102 performs an operation involved with standard control and communication processing as will be described later by reading a program (by way of example, a system program and a standard control program (a user program)) stored in storage 108, developing the program on main memory 106, and executing the program. Storage 108 is implemented, for example, by a non-volatile storage device such as a hard disk drive (HDD) or a solid state drive (SSD). Main memory 106 is implemented by a volatile storage device such as a dynamic random access memory (DRAM) or a static random access memory (SRAM).

Chip set 104 performs processing as standard control unit 100 as a whole by mediating data exchange between processor 102 and each device.

In addition to a system program for performing a basic function, a standard control program for realizing standard control created in conformity with an object to be controlled such as a facility or a machine is stored in storage 108.

Network controller 110 exchanges data with an arbitrary information processing apparatus such as a gateway or a database server over higher-order network 20.

USB controller 112 exchanges data with support apparatus 500 through USB connection.

Memory card interface 114 is constructed such that a memory card 116 is attachable thereto and detachable therefrom, and allows writing of data into memory card 116 and reading of various types of data (a standard control program or trace data) from memory card 116.

Internal bus controller 118 corresponds to a communication interface for electrical connection of standard control unit 100 to safety control unit 200 and functional unit 350 through internal bus 18. Internal bus controller 118 functions as a communication master for cyclic communication through internal bus 18.

Field network controller 120 corresponds to a communication interface for electrical connection between standard control unit 100 and remote IO apparatus 4 over field network 6. Field network controller 120 functions as a communication master for cyclic communication over field network 6.

Process network controller 122 corresponds to a communication interface for electrical connection between standard control unit 100 and safety driver 12 over process network 10. Process network controller 122 is responsible for communication control for exchange of data in each predetermined cycle time over process network 10.

Counter 126 is used as time reference for managing timing of execution of various programs to be executed in standard control unit 100. RTC 128 is a kind of counter with a time counting function and provides current time to processor 102 or the like.

Though FIG. 3 shows an exemplary configuration in which a necessary function is provided by execution of a program by processor 102, a part or the entirety of these provided functions may be performed by using dedicated hardware circuitry (for example, an ASIC or an FPGA). Alternatively, a principal part of standard control unit 100 may be implemented by hardware (for example, an industrial personal computer based on a general-purpose personal computer) in accordance with a general-purpose architecture. In this case, using virtualization technology, a plurality of operating systems (OSs) different in application may be executed in parallel and a necessary application may be executed on each OS. A configuration in which a function of a display apparatus or a support apparatus is incorporated in standard control unit 100 may be adopted.

(c2: Safety Control Unit)

Figure 4:
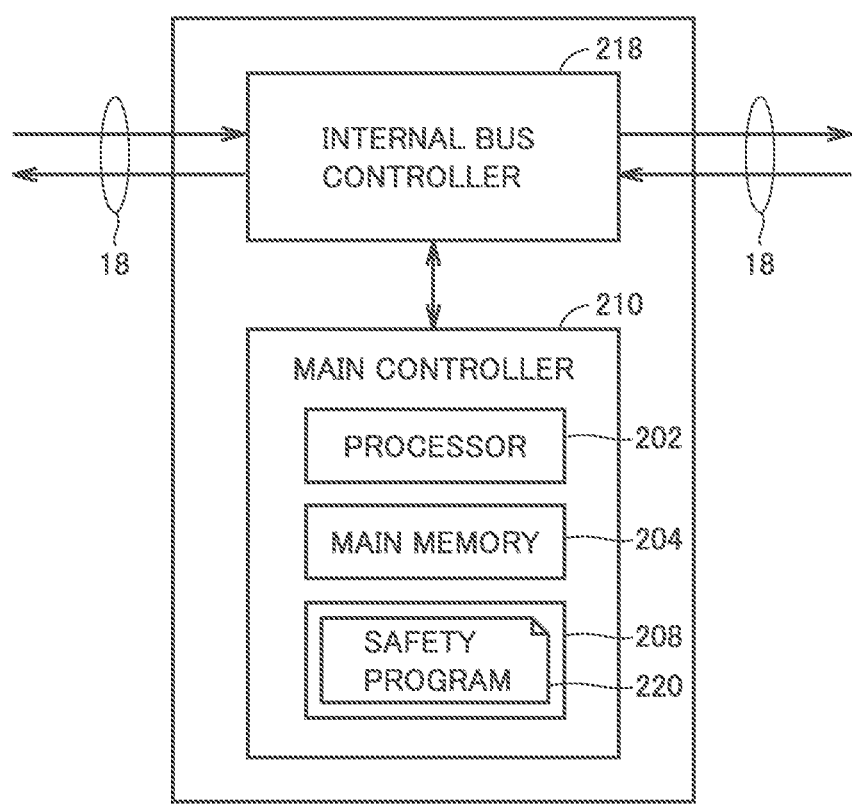
FIG. 4 is a schematic diagram showing an exemplary hardware configuration of a safety control unit included in the control system according to the present embodiment.

FIG. 4 is a schematic diagram showing an exemplary hardware configuration of safety control unit 200 included in control system 1 according to the present embodiment. Referring to FIG. 4, safety control unit 200 includes an internal bus controller 218 and a main controller 210.

Internal bus controller 218 corresponds to a communication interface for electrical connection between standard control unit 100 and safety control unit 200 through internal bus 18. Internal bus controller 218 functions as a communication slave for participating in data communication through internal bus 18.

Main controller 210 includes a processor 202, a main memory 204, and a storage 208. Processor 202 corresponds to a computing processing unit that performs a control operation or communication processing and is configured with a CPU, an MPU, or a GPU. Specifically, processor 202 carries out safety control or the like by reading a safety program 220 stored in storage 208, developing the safety program on main memory 204, and executing the safety program.

Though FIG. 4 shows an exemplary configuration in which a necessary function is provided by execution of a program by processor 202, a part or the entirety of these provided functions may be performed by using dedicated hardware circuitry (for example, an ASIC or an FPGA).

(c3: Support Apparatus)

Figure 5:
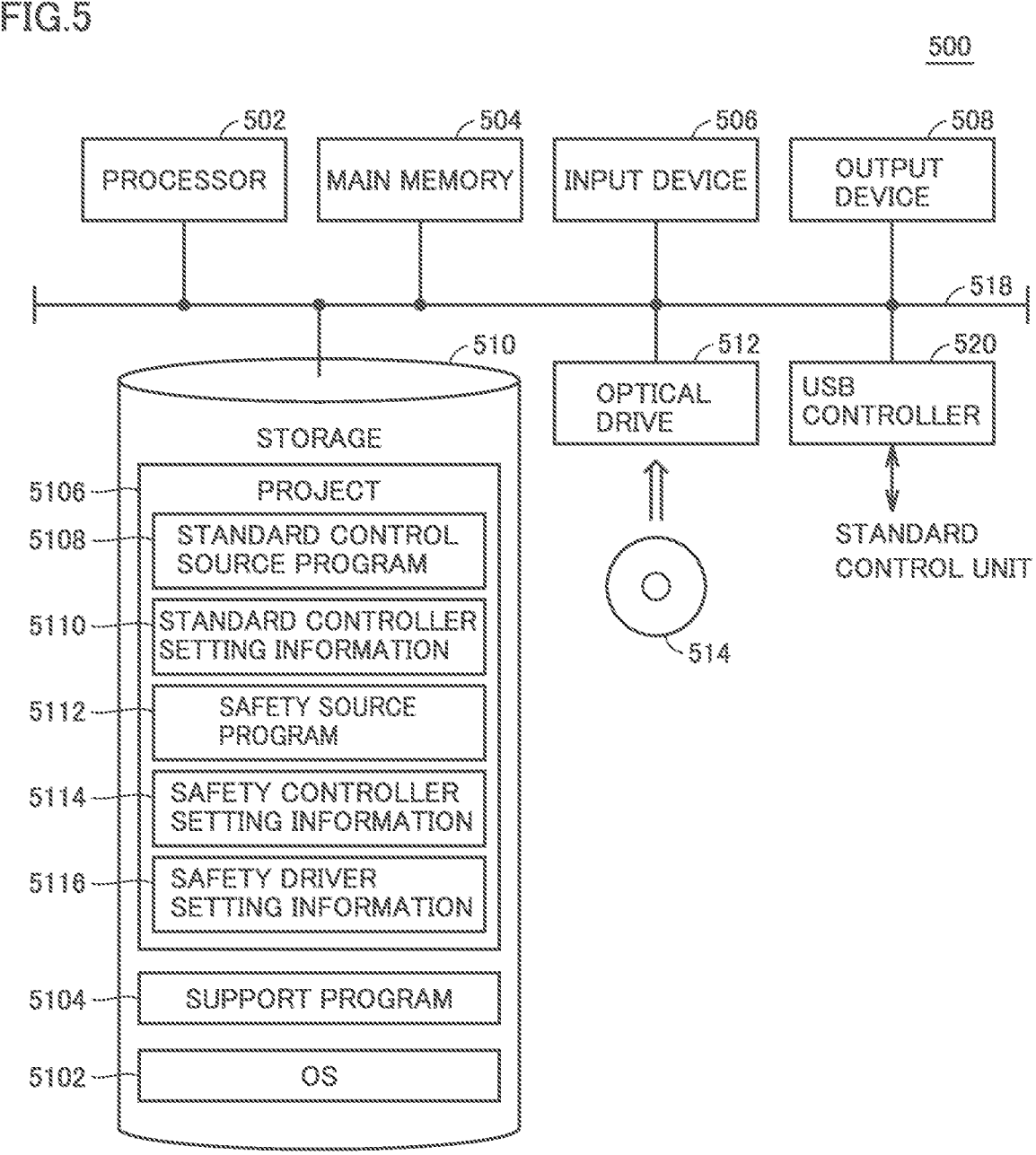
FIG. 5 is a schematic diagram showing an exemplary hardware configuration of a support apparatus included in the control system according to the present embodiment.

FIG. 5 is a schematic diagram showing an exemplary hardware configuration of support apparatus 500 included in control system 1 according to the present embodiment. Support apparatus 500 is implemented by hardware (for example, a general-purpose personal computer) in accordance with a general-purpose architecture by way of example.

Referring to FIG. 5, support apparatus 500 includes a processor 502, a main memory 504, an input device 506, an output device 508, a storage 510, an optical drive 512, and a USB controller 520. These components are connected to one another through a processor bus 518.

Processor 502 is configured with a CPU, an MPU, or a GPU, and performs various types of processing as will be described later by reading a program (an OS 5102 and a support program 5104 by way of example) stored in storage 510, developing the program on main memory 504, and executing the program.

Main memory 504 is implemented by a volatile storage device such as a DRAM or an SRAM. Storage 510 is implemented by a non-volatile storage device such as an HDD or an SSD.

In addition to OS 5102 for performing a basic function, support program 5104 for providing a function as support apparatus 500 is stored in storage 510. Support program 5104 provides a development environment for performing at least a part of creation of contents of processing performed by standard control unit 100 and making of settings involved with communication processing.

Furthermore, project data 5106 created by a user in the development environment provided by execution of support program 5104 is stored in storage 510.

Support apparatus 500 provides the development environment that allows, in an integrated manner, settings for each device included in control system 1 and creation of a program to be executed in each device. Project data 5106 includes data generated in such an integrated development environment. Typically, project data 5106 includes a standard control source program 5108, standard controller setting information 5110, a safety source program 5112, safety controller setting information 5114, and safety driver setting information 5116.

Standard control source program 5108 is converted to an object code, then transmitted to standard control unit 100, and stored as a standard control program 1104. Similarly, standard controller setting information 5110 is also transmitted to standard control unit 100.

Safety source program 5112 is converted to an object code, then transmitted to safety control unit 200, and stored as safety program 220 (see FIG. 4). Similarly, safety controller setting information 5114 is also transmitted to safety control unit 200.

Safety driver setting information 5116 is transmitted to safety driver 12.

Input device 506 is constituted of a keyboard, a mouse, and the like, and accepts an operation by a user. Output device 508 is constituted of a display, various indicators, a printer, and the like, and provides a result of processing from processor 502.

USB controller 520 exchanges data with standard control unit 100 and the like through USB connection.

Support apparatus 500 includes optical drive 512. A program stored in a recording medium 514 in which a computer readable program is stored in a non-transitory manner (for example, an optical recording medium such as a digital versatile disc (DVD)) is read from the recording medium and installed in storage 510 or the like.

Though support program 5104 and the like executed in support apparatus 500 may be installed from computer readable recording medium 514, it may be installed as being downloaded from a server apparatus over a network. A function provided by support apparatus 500 according to the present embodiment may be performed by using a part of a module provided by the OS.

Though FIG. 5 shows an exemplary configuration in which a necessary function as support apparatus 500 is provided by execution of a program by processor 502, a part or the entirety of these provided functions may be performed by using dedicated hardware circuitry (for example, an ASIC or an FPGA).

While control system 1 is operating, support apparatus 500 may be detached from standard control unit 100.

D. Communication Processing in Control Device 2

Communication processing in control device 2 will now be described.

(d1: FSoE over Field Network)

FIG. 6 is a schematic diagram for illustrating FSoE in control system 1 according to the present embodiment. FIG. 6 shows an example in which data collected by safety functional unit 360 connected through a bus to coupler unit 300 is transmitted to safety control unit 200 in a configuration in which standard control unit 100 and coupler unit 300 are connected to each other over field network 6.

A frame in conformity with EtherCAT® is periodically transmitted to field network 6. Standard control unit 100 obtains input data collected by the functional unit through frames periodically transmitted over field network 6. Standard control unit 100 performs a control operation based on obtained input data and transmits in frames, a control instruction (output data) obtained by performing the control operation to the functional unit.

More specifically, standard control unit 100 periodically executes a control task 150 in correspondence with a frame transmission cycle time over field network 6. In other words, standard control unit 100 implementing control device 2 periodically performs a control operation for controlling an object to be controlled. In each cycle of execution (task cycle time) of control task 150, IO refresh processing 152, user program execution processing 154 such as a sequence operation, motion program execution processing 156, and the like is performed. IO refresh processing 152 is processing for updating data included in a frame transmitted over field network 6 to a state that can be referred to in standard control unit 100. The frame transmission cycle time is normally set to coincide with the task cycle time in standard control unit 100.

Data transmitted in conformity with FSoE is transmitted to standard control unit 100 in frames transmitted over field network 6, and thereafter transferred to safety control unit 200 through internal bus 18 (see FIGS. 3 and 4) under the control by standard control unit 100. In other words, standard control unit 100 mediates data for implementing FSoE.

Processing for transferring data transmitted over field network 6 to safety control unit 200 and processing for storing data transmitted from safety control unit 200 in frames and sending the frames over field network 6 (such processing being also referred to as "FSoE data loopback processing" below) is performed as a part of IO refresh processing 152 included in control task 150.

As FSoE data loopback processing is performed as a part of IO refresh processing 152, responsiveness of FSoE can be secured. In other words, a time period required for exchange of data in conformity with FSoE is guaranteed as a time period determined in accordance with the task cycle time (that is, the transmission cycle time).

(d2: CIP Safety Over Process Network)

Figure 7:
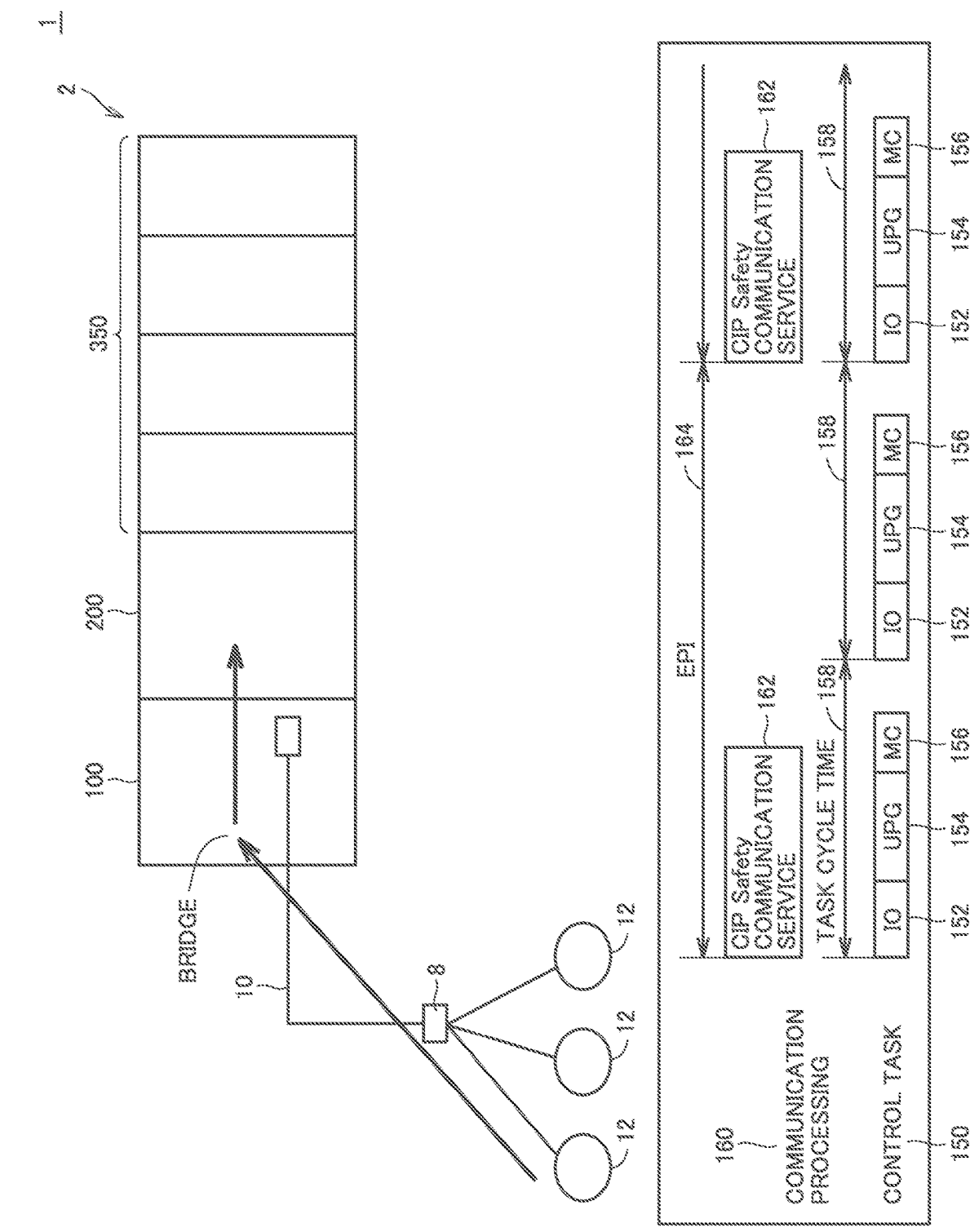
FIG. 7 is a schematic diagram for illustrating CIP Safety in the control system according to the present embodiment.

FIG. 7 is a schematic diagram for illustrating CIP Safety in control system 1 according to the present embodiment. FIG. 7 shows an example in which data is exchanged between safety control unit 200 and safety driver 12 in a configuration in which standard control unit 100 and safety driver 12 representing an exemplary slave device are connected to each other over process network 10.

Under CIP Safety, a frame (a CIP Safety frame) is exchanged for each connection defined in advance between standard control unit 100 and each slave device (safety driver 12 in the example shown in FIG. 7). An expected packet interval (EPI) is set in advance as a cycle time within which exchange of a frame for each connection can be completed. In other words, all CIP Safety frames corresponding to each connection are generated and transmitted at least once within a corresponding EPI. The EPI may be defined for each communication counterpart device (target device).

Standard control unit 100 transfers a frame received from each slave device to safety control unit 200 through internal bus 18. In other words, standard control unit 100 functions as a bridge that mediates frame transfer between each slave device and safety control unit 200. The function as the bridge is performed as communication processing 160 independent of control task 150.

In communication processing 160, a CIP Safety communication service 162 for processing a CIP Safety frame in conformity with CIP Safety is performed.

By separating communication processing 160 from control task 150, responsiveness of CIP Safety can be secured without being affected by a time period required for user program execution processing 154 performed in control task 150. In other words, by performing control task 150 and communication processing 160 independently of each other, both of a shorter cycle time of execution of the standard control program (user program) in standard control unit 100 and improvement in responsiveness of CIP Safety can be achieved.

E. Exemplary Implementation of CIP Safety

An exemplary implementation of CIP Safety in control device 2 will now be described.

Figure 8:
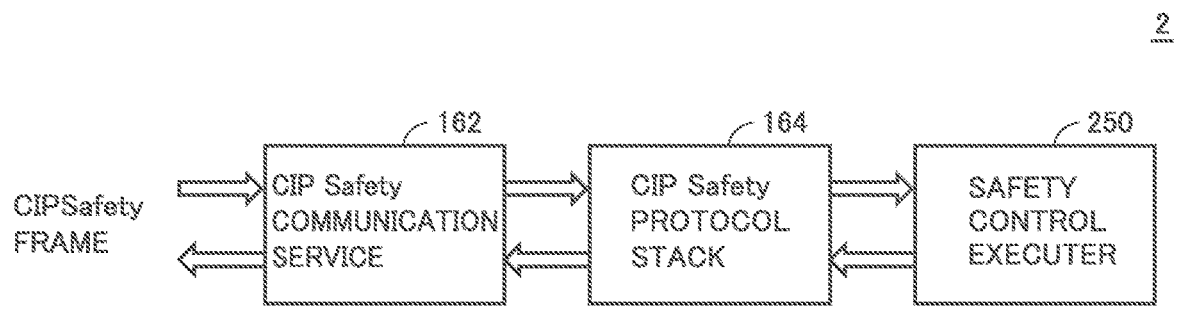
FIG. 8 is a schematic diagram showing an exemplary functional configuration for implementing CIP Safety in a control device according to the present embodiment.

FIG. 8 is a schematic diagram showing an exemplary functional configuration for implementing CIP Safety in control device 2 according to the present embodiment. Referring to FIG. 8, control device 2 includes CIP Safety communication service 162, a CIP Safety protocol stack 164, and a safety control executer 250 as functions in connection with CIP Safety.

CIP Safety communication service 162 corresponds to a processing module configured to process a CIP Safety frame. Specifically, CIP Safety communication service 162 receives a CIP Safety frame from a slave device and provides the received CIP Safety frame to CIP Safety protocol stack 164. CIP Safety communication service 162 transmits the CIP Safety frame to a destination slave device in response to an instruction from CIP Safety protocol stack 164.

CIP Safety protocol stack 164 manages exchange of a CIP Safety frame in conformity with CIP Safety. Specifically, CIP Safety protocol stack 164 analyzes the provided CIP Safety frame and provides data (input data) included therein to safety control executer 250. CIP Safety protocol stack 164 generates a CIP Safety frame in accordance with a control instruction (output data) from safety control executer 250 and provides the CIP Safety frame to CIP Safety communication service 162.

Safety control executer 250 calculates a control instruction (output data) by performing a control operation involved with safety control based on the input data from CIP Safety protocol stack 164.

FIGS. 9(*a*) and 9(*b*) are schematic diagrams showing an exemplary implementation of the functional configuration shown in FIG. 8. FIG. 9 (*a*) shows an exemplary configuration including standard control unit 100 and safety control unit 200. In this exemplary configuration, CIP Safety communication service 162 is implemented in standard control unit 100 and CIP Safety protocol stack 164 and safety control executer 250 are implemented in safety control unit 200.

FIG. 9 (*b*) shows an exemplary configuration in which all functions are implemented in safety control unit 200. In the exemplary configuration, CIP Safety communication service 162, CIP Safety protocol stack 164, and safety control executer 250 are implemented in safety control unit 200.

Without being limited to the exemplary configuration shown in FIGS. 9(*a*) and 9(*b*), any form of implementation may be adopted.

Standard control unit 100 or safety control unit 200 that implements control device 2 thus performs communication processing for periodically exchanging data with a slave device.

F. Responsiveness of CIP Safety

Responsiveness (a minimum value of the EPI) of CIP Safety will now be described.

(f1: Factors Determining Responsiveness of CIP Safety)

A shorter EPI means a shorter cycle time of update of data. Therefore, in consideration of control performance or the like, the EPI preferably as short as possible is set. A settable EPI, however, is determined under restrictions as shown below.

(1) Various types of settings for unit that affect responsiveness of CIP Safety (2) Contents of settings for CIP Safety (3) Processing capability (spec) of unit that provides CIP Safety communication service 162

(4-1) Other services provided by unit that provides CIP Safety communication service 162

(4-2) Priority in unit that provides CIP Safety communication service 162

A settable range of the EPI is determined based on at least one of such restriction factors. Each restriction factor will be described below.

(f2: Various Types of Settings for Unit that Affect Responsiveness of CIP Safety)

Various types of settings for a unit that affect responsiveness of CIP Safety include each cycle time of execution (task cycle time) of control task 150. Therefore, in control system 1 according to the present embodiment, the settable range of the EPI may be determined based on a cycle time (task cycle time) of a control operation performed in standard control unit 100.

(f3: Contents of Settings for CIP Safety)

Contents of settings for CIP Safety include the number of connections and a data size in CIP Safety. The number of connections in CIP Safety may include both of the number of connections (the maximum number) specifically supported by control system 1 and the number of connections arbitrarily set by a user. The data size in CIP Safety may encompass both of a size of data allocated to each connection and total data allocated to all connections.

Figure 10:
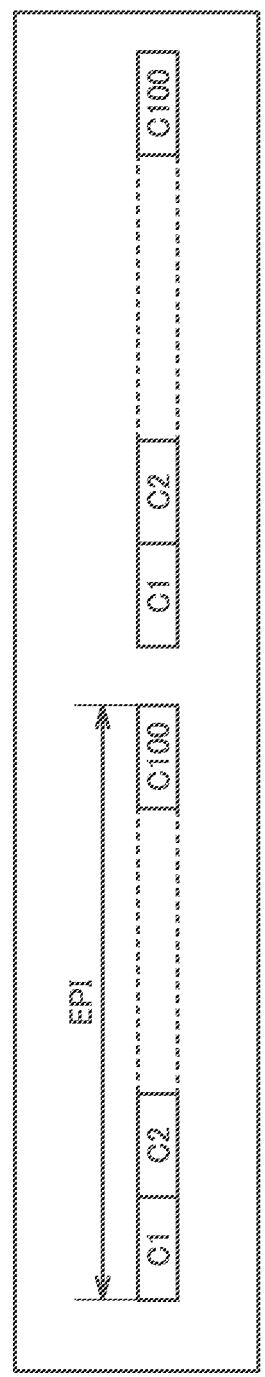
FIGS. 10(a) and 10(b) are schematic diagrams for illustrating exemplary contents of settings for CIP Safety in the control device according to the present embodiment.
Figure 10:
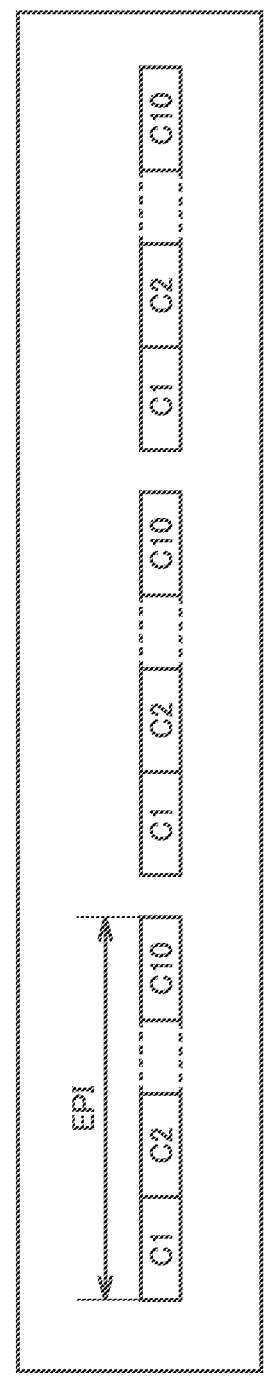

FIGS. 10(*a*) and 10(*b*) are schematic diagrams for illustrating exemplary contents of settings for CIP Safety in control device 2 according to the present embodiment. FIG. 10(*a*) shows an example in which connections C1 to C100 are set and FIG. 10(*b*) shows an example in which connections C1 to C10 are set.

As is seen from comparison between FIGS. 10(*a*) and 10(*b*), as the number of connections is larger, the EPI is longer. Similarly, as the data size is larger, the EPI is longer.

Depending on contents of settings for CIP Safety, responsiveness of CIP Safety (that is, the minimum value of the EPI) thus varies. Therefore, in control system 1 according to the present embodiment, the settable range of the EPI may be determined based on at least one of the number of connections and a data size of data exchanged with a slave device.

Since one or more connections can be defined for each communication counterpart device (target device), the EPI can also be defined for each target device. In other words, the settable range of the EPI may be determined for each device with which control device 2 exchanges data.

(f4: Processing Capability of Unit that Provides CIP Safety Communication Service 162)

Processing capability (spec) of a unit that provides CIP Safety communication service 162 means hardware performance of a unit (standard control unit 100 or safety control unit 200 as shown in FIGS. 9(a) and 9(b)) in which CIP Safety communication service 162 is implemented. Such processing capability (spec) is dependent on performance of a processor mounted on the unit, a memory capacity, a data transmission rate, and the like.

Therefore, in control system 1 according to the present embodiment, the settable range of the EPI may be determined based on processing capability of control device 2 (standard control unit 100 and safety control unit 200).

(f5: Other Services Provided by Unit that Provides CIP Safety Communication Service 162 and Priority in Unit that Provides CIP Safety Communication Service 162)

Figure 11:
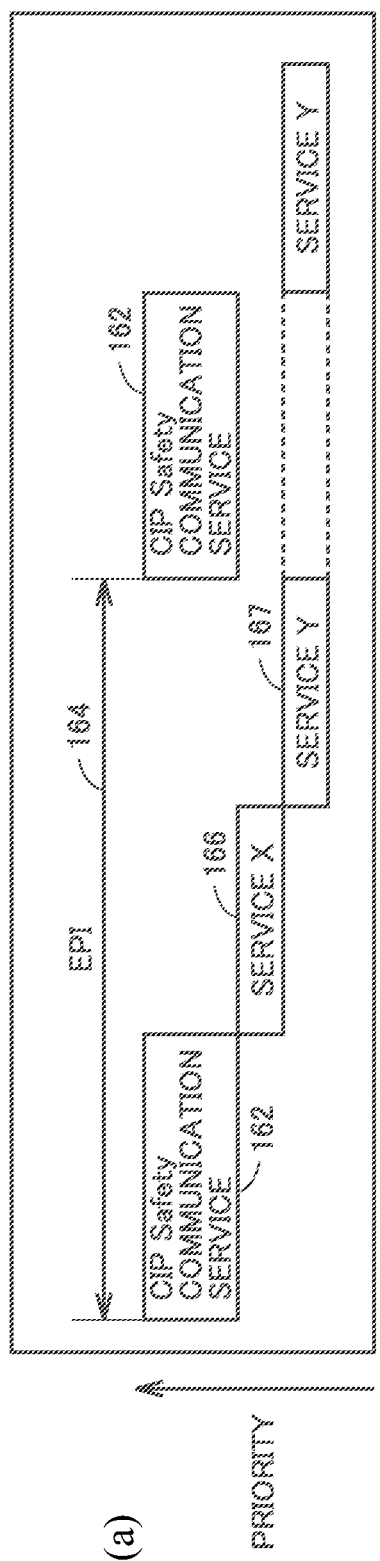
FIGS. 11(a) and 11(b) are schematic diagrams for illustrating exemplary execution of a CIP Safety communication service in the control device according to the present embodiment.
Figure 11:
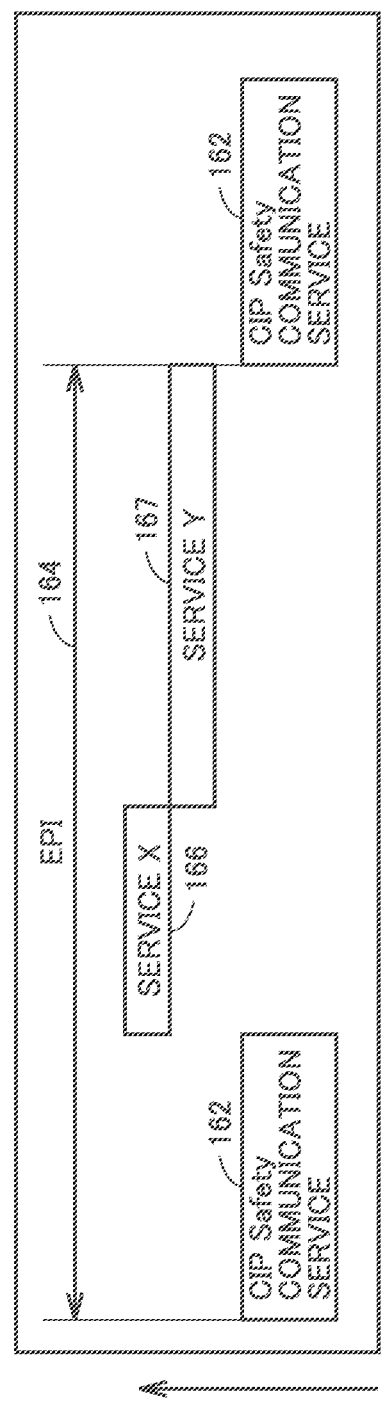

FIGS. 11(a) and 11(b) are schematic diagrams for illustrating exemplary execution of the CIP Safety communication service in control device 2 according to the present embodiment. FIGS. 11(a) and 11(b) show exemplary execution in the unit (standard control unit 100 or safety control unit 200) that provides CIP Safety communication service 162.

In each of FIGS. 11(a) and 11(b), a common resource is used to perform a service X 166 and a service Y 167 in addition to CIP Safety communication service 162. FIG. 11(a) shows an example in which CIP Safety communication service 162 is performed with priority higher than other services being placed thereon, and FIG. 11(b) shows an example in which CIP Safety communication service 162 is performed with priority lower than other services being placed thereon.

More specifically, when CIP Safety communication service 162 is higher in priority than other services as shown in FIG. 11(a), the EPI can be shorter because CIP Safety communication service 162 is preferentially performed.

In contrast, when other services are higher in priority than CIP Safety communication service 162 as shown in FIG. 11(b), a cycle time of performing CIP Safety communication service 162 is longer, and hence the EPI is accordingly inevitably longer.

Responsiveness (that is, the minimum value of the EPI) of CIP Safety thus varies depending on contents of the service performed in the unit that provides CIP Safety communication service 162 and the priority defined for each service. Therefore, in control system 1 according to the present embodiment, the settable range of the EPI may be determined based on the priority defined for a control operation performed in standard control unit 100.

Normally, for each of other services provided by the unit that provides CIP Safety communication service 162, activation or inactivation of execution can be set in advance. At least one of services, however, cannot be inactivated, and execution thereof may be fixed.

The priority in the unit that provides CIP Safety communication service 162 can arbitrarily be set. The priority of at least one of services may also be set to a designed value.

(f6: Summary)

As described above, responsiveness of CIP Safety is preferably enhanced as much as possible (that is, the EPI as short as possible is set) to improve control performance. It may be difficult, however, to shorten the length of the EPI due to various restrictions. In control system 1 according to the present embodiment, the settable range of the EPI may be determined with both of the restriction factor (by way of example, (1), (4-1), and (4-2) described above) determined in accordance with contents of processing performed by standard control unit 100 and safety control unit 200 that implement control device 2 and the restriction factor (by way of example, (2) described above) determined in accordance with settings involved with communication processing being reflected.

G. Support for Settings for CIP Safety

Control device 1 according to the present embodiment can also provide a function to support settings of responsiveness (the length of the EPI) of CIP Safety with the restriction factors as described above being reflected. The function to support settings of responsiveness (the length of the EPI) of CIP Safety will be described below. Specifically, control system 1 according to the present embodiment can automatically calculate a minimum value of the settable EPI determined in accordance with performance of the unit and current settings.

(g1: Method of Calculating Minimum Value of EPI)

An exemplary method of calculating a minimum value of a settable EPI will initially be described.

Figure 12:
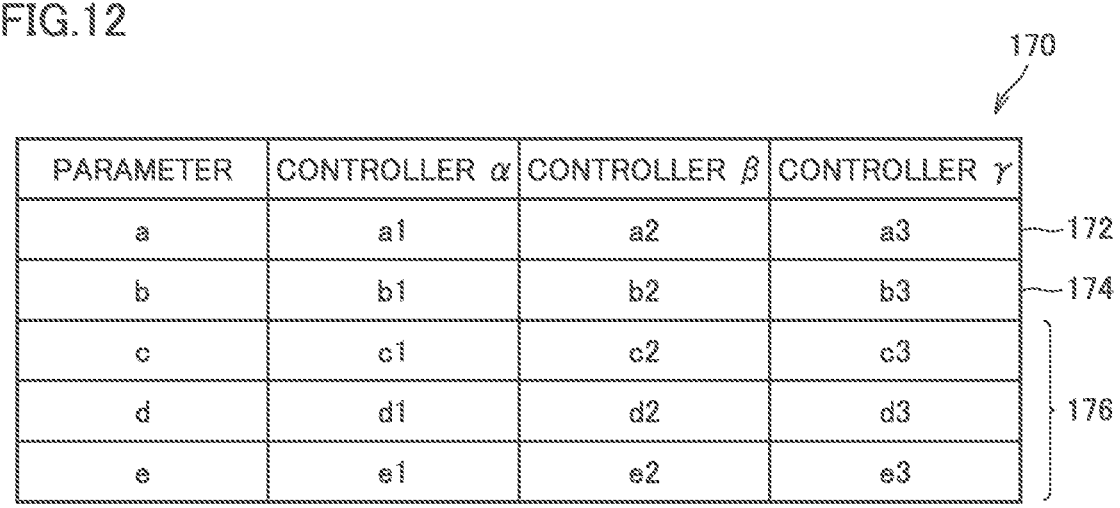
FIG. 12 is a diagram showing an exemplary parameter table used for calculating a minimum value of an EPI settable in the control system according to the present embodiment.

FIG. 12 is a diagram showing an exemplary parameter table 170 used for calculating a minimum value of the EPI settable in control system 1 according to the present embodiment. Referring to FIG. 12, parameter table 170 includes parameter values including a first parameter 172, a second parameter 174, and a third parameter group 176 for each type of a controller (typically, standard control unit 100) by way of example.

First parameter 172 reflects a restriction factor for "(1) Various types of settings for unit that affect responsiveness of CIP Safety."

Second parameter 174 reflects a restriction factor for "(2) Contents of settings for CIP Safety."

Third parameter group 176 reflects a restriction factor for "(4-1) Other services provided by unit that provides CIP Safety communication service 162" and "(4-2) Priority in unit that provides CIP Safety communication service 162."

First parameter 172, second parameter 174, and third parameter group 176 each reflect the restriction factor for "(3) Processing capability (spec) of unit that provides CIP Safety communication service 162."

As shown in FIG. 12, as the type of the controller of interest is determined, five corresponding parameter values are read from parameter table 170. The minimum value of the settable EPI is calculated in accordance with an expression (1) as shown below, based on the read parameter values and contents of settings.

$$\text{Minimum value of settable } EPI = a \times Ts + b \times Sc + c + d + e \quad (1)$$

A set value Ts represents each cycle time (task cycle time) of execution of control task 150. In other words, set value Ts means an IO refresh cycle time. A set value Sc represents the number of connections of CIP Safety. A data size of CIP Safety may be employed as set value Sc.

Parameter values (parameter values c, d, and e) in third parameter group 176 reflect a service to be performed, priority, and the like. Therefore, when the service performed in the controller of interest or the priority is changed, the minimum value of the settable EPI may be calculated again in accordance with the changed contents of settings.

Figure 13:
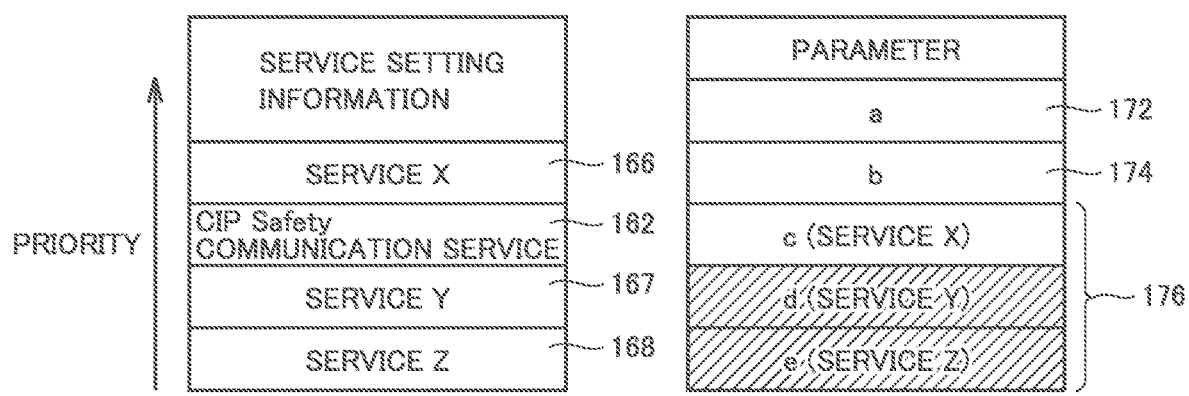
FIG. 13 is a diagram for illustrating processing for calculating again, the minimum value of the EPI settable in the control system according to the present embodiment.

FIG. 13 is a diagram for illustrating processing for calculating again the minimum value of the EPI settable in control system 1 according to the present embodiment. Referring to FIG. 13, when contents of the service performed in the controller of interest or the priority defined for the service are/is changed, an applied parameter may be selected again and the minimum value of the settable EPI may be calculated again.

In the example shown in FIG. 13, priority of CIP Safety communication service 162 is highest next to service X 166. Service Y 167 and a service Z 168 are lower in priority than CIP Safety communication service 162.

In such a case, it is substantially only service X 166 that affects execution of CIP Safety communication service 162. Therefore, in calculating the minimum value of the settable EPI, only a parameter value corresponding to service X 166 may be reflected. For example, when parameter values c, d, and e included in third parameter group 176 correspond to service X 166, service Y 167, and service Z 168, respectively, only parameter value c is reflected. In other words, the minimum value of the settable EPI is calculated in accordance with an expression (2) as shown below.

$$\text{Minimum value of settable } EPI = a \times Ts + b \times Sc + c \quad (2)$$

Thus, only the parameter associated with the service higher in priority than CIP Safety communication service 162 among services performed in the controller of interest may be reflected.

Since there is no essential restriction factor for a maximum value of the EPI, a predetermined value may be set as the maximum value of the EPI. Alternatively, any value smaller than a time period on which determination as a communication error (time-out) is based may be set as the maximum value of the EPI.

(g2: Functional Configuration)

A function to calculate the minimum value of the settable EPI as described above is typically implemented in support apparatus 500. A functional configuration in an implementation in support apparatus 500 will be described below.

Figure 14:
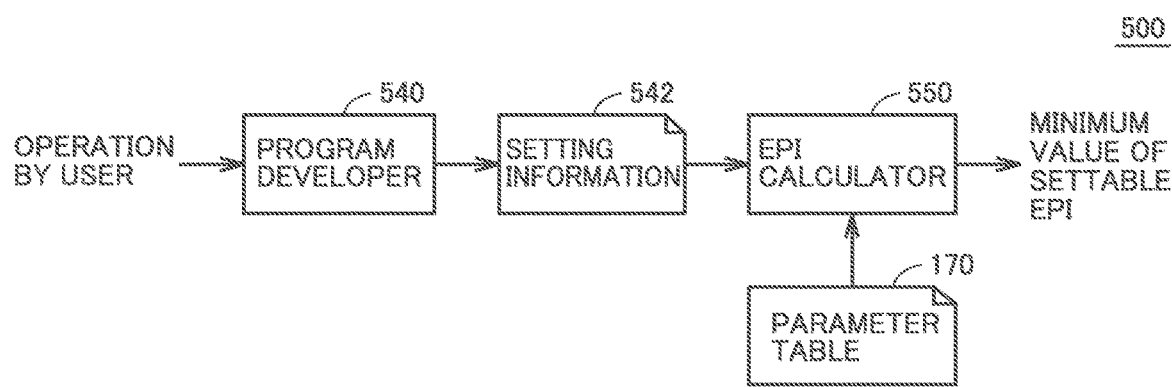
FIG. 14 is a block diagram showing an exemplary functional configuration of the support apparatus included in the control system according to the present embodiment.

FIG. 14 is a block diagram showing an exemplary functional configuration of support apparatus 500 included in control system 1 according to the present embodiment. A main function shown in FIG. 14 is performed by execution of support program 5104 by processor 502 of support apparatus 500 (FIG. 5).

Referring to FIG. 14, support apparatus 500 includes a program developer 540 and an EPI calculator 550.

Program developer 540 provides an interface for developing a program to be executed in control device 2 and for making necessary settings. Program developer 540 generates project data 5106 (see FIG. 5 or the like) including standard control source program 5108, standard controller setting information 5110, safety source program 5112, safety controller setting information 5114, and safety driver setting information 5116, in accordance with an operation by a user.

Program developer 540 thus provides a development environment for performing at least a part of creation of contents of processing performed by standard control unit 100 and safety control unit 200 that implement control device 2 and making of settings involved with communication processing.

EPI calculator 550 calculates the minimum value of the settable EPI based on setting information 542 (including standard controller setting information 5110 and safety controller setting information 5114) generated by program developer 540 and parameter table 170 (see FIG. 12). The minimum value of the settable EPI calculated by EPI calculator 550 may be presented to a user through output device 508 (see FIG. 5 and the like) such as a display.

EPI calculator 550 thus determines a settable range of a cycle time (EPI) of exchange of data with a slave device based on contents set in the development environment provided by program developer 540.

(g3: Exemplary User Interface Screen)

An exemplary user interface screen for presenting to a user, a result of calculation of the minimum value of the settable EPI as described above will now be described.

FIG. 15 is a diagram showing an exemplary user interface screen provided by control system 1 according to the present embodiment. A user interface screen 570 shown in FIG. 15 may typically be shown on support apparatus 500.

Referring to FIG. 15, user interface screen 570 includes an EPI settable range 572 brought in correspondence with setting information 574. Setting information 574 includes a task cycle time 575 (setting Ts), the number of connections 576 (setting Sc), and type information 577 as setting items.

Support apparatus 500 thus calculates the minimum value of the settable EPI and presents the minimum value to the user, together with setting information corresponding to calculation of the EPI.

FIGS. 16(a) and 16(b) are diagrams showing another exemplary user interface screen provided by control system 1 according to the present embodiment. In a user interface screen 580 shown in FIG. 16(a), a current EPI set value 582 is shown for each target device 588. Setting information 584 (a task cycle time 585 (setting Ts), the number of connections 586 (setting Sc), and type information 587) is shown in correspondence with EPI set value 582 for each target device 588.

When EPI set value 582 is smaller than the minimum value of the settable EPI calculated based on corresponding setting information 584 (that is, out of the settable range), an error may be presented to the user. The error may be presented in any form, and for example, such a manner that a color of a character or a background of corresponding EPI set value 582 is different from that in a normal manner of representation may be adopted. FIGS. 16(a) and 16(b) show examples in which an attention representation 589 for presenting an error is given for EPI set value 582. Alternatively, corresponding EPI set value 582 may blink or an audio notification may be given.

As shown in FIG. 16 (b), for EPI set value 582 that falls under an error, a message 579 that suggests change of contents of settings in setting information 584 may be shown such that the EPI is within the settable range. In an example shown in FIG. 16 (b), a message indicating that EPI set value 582 can be within the settable range by reducing the number of connections 586 (setting Sc) is presented. Contents included in message 579 that suggest change of contents of settings are determined by generation by support apparatus 500, of some candidates different in setting information 584 and calculation of the minimum value of the settable EPI for each candidate.

Without being limited to the number of connections 586, change of other contents of settings may be suggested.

FIG. 17 is a diagram showing yet another exemplary user interface screen provided by control system 1 according to the present embodiment. A user interface screen 590 shown in FIG. 17 provides an interface for making settings involved with CIP Safety. User interface screen 590 includes information on connection defined for a port to be set.

More specifically, user interface screen 590 includes a flag 592 for selecting activation or inactivation of settings of connection, setting 593 of data allocated to connection of interest, a minimum value 594 of the corresponding settable EPI, and a time period 596 for network response to a communication counterpart device (target device). Time period 596 for network response may be set to a value calculated by simulation or a value obtained by actual measurement (an actually measured value).

When the set value of the EPI is out of the settable range in such a setting interface, an error message 595 including the settable range may be shown.

In generating a program in an executable form transferred from project data 5106 to each unit in the development environment provided by support apparatus 500, whether or not the set EPI is within the settable range may be determined, and when the EPI is out of the settable range, an error message may be presented.

As shown in FIGS. 16 and 17 described above, support apparatus 500 may perform a notification function to give a notification when a set value of a cycle time of exchange of data with a slave device is out of the settable range of the EPI.

(g4: Flowchart)

A processing procedure for performing processing for calculating the minimum value of the settable EPI as described above will now be described.

Figure 18:
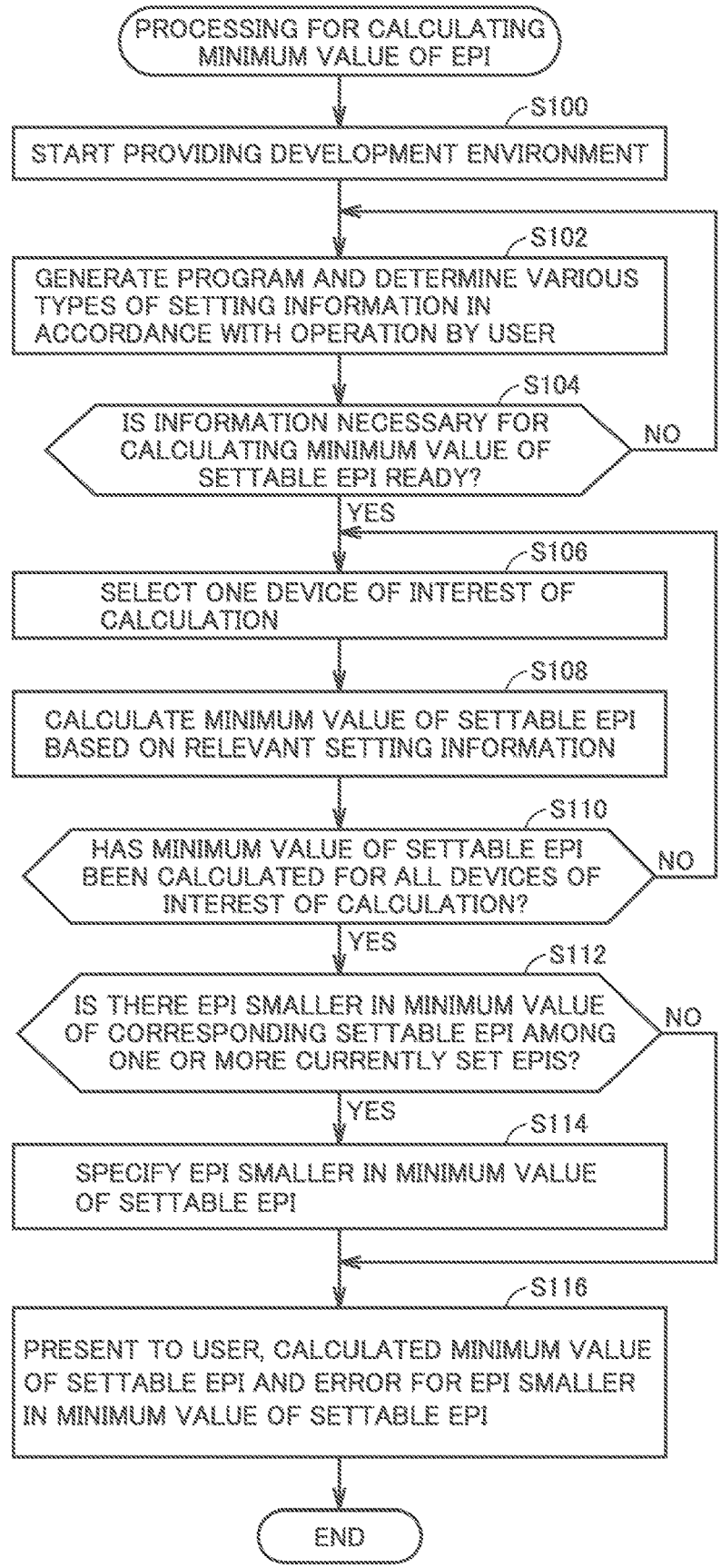
FIG. 18 is a flowchart showing an exemplary procedure of processing performed in the support apparatus included in the control system according to the present embodiment.

FIG. 18 is a flowchart showing an exemplary procedure of processing performed in support apparatus 500 included in control system 1 according to the present embodiment. Each step shown in FIG. 18 is performed by execution of support program 5104 by processor 502 of support apparatus 500 (FIG. 5).

Referring to FIG. 18, support apparatus 500 starts providing the development environment in response to an operation by a user (step S100). Specifically, support apparatus 500 performs processing for providing the development environment for performing at least a part of creation of contents of processing performed by standard control unit 100 and making of settings involved with communication processing.

Support apparatus 500 generates a program and determines various types of setting information in response to an operation by the user (step S102). Then, support apparatus 500 determines whether or not information necessary for calculation of the minimum value of the settable EPI is ready (step S104). When information necessary for calculation of the minimum value of the settable EPI is not ready (NO in step S104), support apparatus 500 repeats processing in step S102 or later.

When information necessary for calculation of the minimum value of the settable EPI is ready (YES in step S104), support apparatus 500 selects one device (target device) of interest of calculation (step S106) and calculates the minimum value of the settable EPI based on relevant setting information (step S108). In other words, support apparatus 500 performs processing for determining the settable range of the EPI which is a cycle time of exchange of data with a slave device, based on contents set in the development environment.

In succession, support apparatus 500 determines whether or not the minimum value of the settable EPI has been calculated for all devices of interest of calculation (step S110). When there remains a device for which the minimum value of the settable EPI has not been calculated (NO in step S110), support apparatus 500 repeats processing in step S106 or later.

When the minimum value of the settable EPI has been calculated for all devices of interest of calculation (YES in step S110), support apparatus 500 determines whether or not there is an EPI smaller in minimum value of the corresponding settable EPI among one or more currently set EPIs (step S112).

When there is an EPI smaller in minimum value of the corresponding settable EPI among the one or more currently set EPIs (YES in step S112), support apparatus 500 specifies the EPI smaller in minimum value of the settable EPI (step S114). When there is no EPI smaller in minimum value of the settable EPI (NO in step S112), processing in step S114 is skipped.

Then, support apparatus 500 presents to a user, the calculated minimum value of the settable EPI and an error for the EPI smaller in minimum value of the settable EPI (step S116). Then, the process ends.

H. Modification

In the description above, an exemplary configuration in which support apparatus 500 calculates the minimum value of the settable EPI is mainly described. Without being limited to support apparatus 500, any processing entity can calculate the minimum value of the settable EPI. For example, a controller (standard control unit 100 or safety control unit 200) may calculate the minimum value of the EPI or a computer arranged on a cloud may calculate the minimum value of the EPI based on setting information provided from support apparatus 500. In other words, any processing entity may perform the method of calculating the minimum value of the settable EPI according to the present embodiment.

CIP Safety is mainly described in detail in the description above. Without being limited to CIP Safety, however, the present invention is widely applicable to data communication in which data of a predetermined data size is periodically exchanged with one or more communication counterparts. For example, the present invention is applicable to normal frame transmission in conformity with EtherNet/IP™.

Control device 2 including standard control unit 100 and safety control unit 200 independent of each other is exemplified in the description above. Without being limited to such a configuration, however, a single controller in which functions of both of these units are integrated may be implemented. Since the essence of the present invention resides in communication processing, control device 2 including both of standard control unit 100 and safety control unit 200 does not necessarily have to be employed but the control device may be configured to include only any one of the units.

I. Additional Aspects

The present embodiment as described above encompasses technical concepts as below.

[Aspect 1]

A control system (1) including a control device (2) and a device (12) configured to communicate with the control device, the control system comprising:

control means (100) configured to periodically perform a control operation (150) for controlling an object to be controlled;

communication processing means (100; 200) configured to perform communication processing (160) for periodically exchanging data with the device;

providing means (500; 540) configured to provide a development environment for performing at least a part of creation of contents of processing performed by the control means and making of settings involved with communication processing by the communication processing means; and determination means (500; 550) configured to determine a settable range of a cycle time of exchange of data with the device based on contents set in the development environment provided by the providing means.

[Aspect 2]

The control system described in Aspect 1, wherein the determination means is configured to determine the settable range with both of a restriction factor determined in accordance with the contents of processing performed by the control means and a restriction factor determined in accordance with settings involved with communication processing by the communication processing means being reflected.

[Aspect 3]

The control system described in Aspect 1 or 2, wherein the determination means is configured to determine the settable range based on at least one of the number of connections and a data size of data exchanged with the device.

[Aspect 4]

The control system described in any one of Aspects 1 to 3, wherein the determination means is configured to determine the settable range based on a cycle time of the control operation performed by the control means.

[Aspect 5]

The control system described in any one of Aspects 1 to 4, wherein the determination means is configured to determine the settable range based on priority defined for the control operation performed by the control means.

[Aspect 6]

The control system described in any one of Aspects 1 to 5, wherein the determination means is configured to determine the settable range based on processing capability of the control device.

[Aspect 7]

The control system described in any one of Aspects 1 to 6, wherein the determination means is configured to determine the settable range for each device with which the control device exchanges data.

[Aspect 8]

The control system described in any one of Aspects 1 to 7, further comprising notification means (500) configured to give a notification when a set value of the cycle time of exchange of data with the device is out of the settable range determined by the determination means.

[Aspect 9]

A support apparatus (500) directed to a control system (1) including a control device (2) and a device (12) configured to communicate with the control device, the control device including control means (100) configured to periodically perform a control operation (150) for controlling an object to be controlled and communication processing means (100; 200) configured to perform communication processing (160) for periodically exchanging data with the device, the support apparatus comprising:

providing means (500; 540) configured to provide a development environment for performing at least a part of creation of contents of processing performed by the control means and making of settings involved with communication processing by the communication processing means; and determination means (500; 550) configured to determine a settable range of a cycle time of exchange of data with the device based on contents set in the development environment provided by the providing means.

[Aspect 10]

A program (5104) for a support apparatus (500) directed to a control system (1) including a control device (2) and a device configured to communicate with the control device, the control device including control means (100) configured to periodically perform a control operation (150) for controlling an object to be controlled and communication processing means (100; 200) configured to perform communication processing (160) for periodically exchanging data with the device, the program, when executed by a computer, causing the computer to perform:

providing a development environment for performing at least a part of creation of contents of processing performed by the control means and making of settings involved with communication processing by the communication processing means (S100); and determining a settable range of a cycle time of exchange of data with the device based on contents set in the development environment (S108).

J. Conclusion

According to the present embodiment, a settable range of a cycle time (EPI) of exchange of data between control device 2 and a slave device can be determined based on contents of processing performed in control device 2 and settings involved with communication processing. Therefore, even a user with less knowledge can set an appropriate cycle time. Thus, occurrence of failure such as communication disconnection due to expiration of the cycle time can be prevented in control devices of various types that are variously set depending on an object to be controlled.

Since the settable range of the cycle time (EPI) of exchange of data can be calculated according to the present embodiment, tuning for finding an appropriate cycle time within the calculated range can readily be achieved.

According to the present embodiment, without existence of real control device 2, the settable range of the cycle time (EPI) of exchange of data can be known in advance, and hence apparatus design can readily be made.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 control system; 2 control device; 4 remote IO apparatus; 6 field network; 8 hub; 10 process network; 12 safety driver; 14 motor; 16 safety component; 18 internal bus; 20 higher-order network; 100 standard control unit; 102, 202, 502 processor; 104 chip set; 106, 204 main memory; 108, 208, 510 storage; 110 network controller; 112, 520 USB controller; 114 memory card interface; 116 memory card; 118, 218 internal bus controller; 120 field network controller; 122 process network controller; 126 counter; 128 RTC; 150 control task; 152 refresh processing; 154 user program execution processing; 156 motion program execution processing; 160 communication processing; 162 communication service; 164 protocol stack; 166 service X; 167 service Y; 168 service Z; 170 parameter table; 172 first parameter; 174 second parameter; 176 third parameter group; 200 safety control unit; 210 main controller; 220 safety program;

250 safety control executer; 300 coupler unit; 350 functional unit; 360 safety functional unit; 500 support apparatus; 504 main memory; 506 input device; 508 output device; 512 optical drive; 514 recording medium; 518 processor bus; 540 program developer; 542, 574, 584 setting information; 550 EPI calculator; 570, 580, 590 user interface screen; 572 settable range; 575, 585 task cycle time; 576, 586 the number of connections; 577, 587 type information; 579 message; 582 EPI set value; 588 target device; 589 attention representation; 592 flag; 593 data setting; 594 minimum value of EPI; 595 error message; 596 network response time period; 1104 standard control program; 5102 OS; 5104 support program; 5106 project data; 5108 standard control source program; 5110 standard controller setting information; 5112 safety source program; 5114 safety controller setting information; 5116 safety driver setting information

The invention claimed is:

1. A control system comprising:
a control device including a processor configured to periodically perform a control operation for controlling an object to be controlled;
a controller including a processor configured to perform communication processing for periodically exchanging data with at least one device that is configured to communicate with the control device; and
a support apparatus including a processor configured to provide a development environment that allows for creating contents of processing to be executed by the control device to perform the control operation and for setting a plurality of settings including a settable range of a cycle time for the controller to periodically exchange the data with the at least one device,
wherein the support apparatus is configured to determine the settable range based on a task cycle time of the control operation performed by the control device and based on a plurality of safety settings,
wherein the cycle time for the controller to periodically exchange the data is an expected packet interval (EPI), and
wherein the EPI is determined based on the task cycle time of the control operation performed by the control device, a number of connections supported by the control system, a size of data allocated to each of the connections, a processing capability of the control device, and a priority of the control operation performed by the control device.

2. The control system according to claim 1, wherein:
the support apparatus is configured to determine the settable range based on at least one of a number of connections of the at least one device and a data size of data exchanged with the at least one device.

3. The control system according to claim 1, wherein:
the support apparatus is configured to determine the settable range based on a priority of the control operation performed by the control device.

4. The control system according to claim 1, wherein:
the support apparatus is configured to determine the settable range based on a processing capability of the control device.

5. The control system according to claim 1, wherein:
the at least one device comprises a plurality of devices, and
the support apparatus is configured to determine the settable range for each device of the plurality of devices with which the control device exchanges data.

6. The control system according to claim 1, wherein the support apparatus is further configured to output a notification when a value of the cycle time is out of the settable range.

7. The control system according to claim 1, wherein the settable range includes a range within which a value may be set, and includes at least one of an upper limit and a lower limit.

8. A support apparatus comprising a processor configured to:
provide a development environment that allows for creating contents of processing to be executed by a control device to periodically perform a control operation for controlling an object to be controlled and for setting a plurality of settings for communication processing by a controller to periodically exchange data with at least one device that is configured to communicate with the control device, the plurality of settings including a settable range of a cycle time for the controller to periodically exchange the data with the at least one device,
wherein the settable range is determined based on a task cycle time of the control operation performed by the control device and based on a plurality of safety settings
wherein the cycle time for the controller to periodically exchange the data is an expected packet interval (EPI), and
wherein the EPI is determined based on the task cycle time of the control operation performed by the control device, a number of connections supported by the control system, a size of data allocated to each of the connections, a processing capability of the control device, and a priority of the control operation performed by the control device.

9. The support apparatus according to claim 8, wherein:
the support apparatus is configured to determine the settable range based on at least one of a number of connections of the at least one device and a data size of data exchanged with the at least one device.

10. The support apparatus according to claim 8, wherein:
the support apparatus is configured to determine the settable range based on a priority of the control operation performed by the control device.

11. The support apparatus according to claim 8, wherein:
the support apparatus is configured to determine the settable range based on a processing capability of the control device.

12. The support apparatus according to claim 8, wherein the settable range includes a range within which a value may be set, and includes at least one of an upper limit and a lower limit.

13. A non-transitory computer-readable storage medium having stored thereon an executable program which, when executed by a processor of a support apparatus, causing the processor to:
provide a development environment that allows for creating contents of processing to be executed by a control device to periodically perform a control operation for controlling an object to be controlled and for setting a plurality of settings for communication processing by a controller to periodically exchange data with at least one device that is configured to communicate with the control device, the plurality of settings including a settable range of a cycle time for the controller to periodically exchange the data with the at least one device, wherein the settable range is determined based on a task cycle time of the control operation performed by the control device and based on a plurality of safety settings, wherein the cycle time for the controller to periodically exchange the data is an expected packet interval (EPI), and wherein the EPI is determined based on the task cycle time of the control operation performed by the control device, a number of connections supported by the control system, a size of data allocated to each of the connections, a processing capability of the control device, and a priority of the control operation performed by the control device.

14. The non-transitory computer-readable storage medium according to claim 13, wherein:
the settable range is determined based on at least one of a number of connections with the at least one device and a data size of data exchanged with the at least one device.

15. The non-transitory computer-readable storage medium according to claim 13, wherein:
the settable range is determined based on a priority of the control operation performed by the control device.

16. The non-transitory computer-readable storage medium according to claim 10, wherein:
the settable range is determined based on a processing capability of the control device.

17. The non-transitory computer-readable storage medium according to claim 10, wherein the settable range includes a range within which a value may be set, and includes at least one of an upper limit and a lower limit.

* * * * *